FIG. 1

INVENTOR
GEORGE B. KEPES

FIG. 7

INVENTOR
GEORGE B. KEPES
BY Smart & Biggar
ATTORNEYS.

United States Patent Office 3,267,783
Patented August 23, 1966

3,267,783
LEAD SLEEVE CUTTING AND HANDLING
EQUIPMENT
George B. Kepes, Montreal, Quebec, Canada, assignor to Northern Electric Company Limited, Montreal, Quebec, Canada
Filed Sept. 14, 1964, Ser. No. 396,002
24 Claims. (Cl. 83—112)

This invention relates to the manufacture of rigid tube or bar material fed continuously from a source, such as continuously extruded lead tubing or sheathing for sleeves used in splicing cables, and more particularly the cutting and handling such material.

A common method of producing lead tubing is by continuous upward extrusion from a press. As the tubing is extruded from the orifice of the press it must be cut into lengths suitable for handling. The cutting process cannot be instantaneous as with plastic or similar materials but must be carried out during a time interval because of the hardness of the material used. To this end an operator is stationed at the extrusion orifice and cuts the tubing as it advances upwardly from the orifice. A second operator is needed to handle each length of severed pipe, lowering it from the top of the furnace and again cutting it to specified shorter lengths for packing and shipping.

The present invention eliminates the need for manual operation in the production of lead sleevings by providing automatic severing and handling apparatus whereby the lead tubing being continuously extruded from a press is severed into sleeves of a length suitable for final packing and the sleeves are transferred for handling or cartoning.

In its broadest aspect the invention consists of apparatus for cutting and handling rigid tube or bar material fed continuously from a source, the apparatus comprising: means to grip the tube material as it is fed from the source; means to sever a given length of tube material as it is fed from the source; the gripping means and the severing means being adapted to travel with the tube material as it moves away from the source whereby their given functions may be performed; and means to transfer the severed tube away from the line of travel of the material and thereafter release it from the gripping means.

Another aspect of the invention resides in apparatus for receiving the severed tube on its release from the gripping means and transferring it to a handling or cartoning station.

In the accompanying drawings which illustrate an example embodiment of the invention.

The embodiment as shown in the drawings (see FIGURE 1) comprises a cutting mechanism 1, a gripping mechanism 2, a transferring mechanism 3, and a receiving mechanism 4, all associated with an extrusion press 5. The cutting, gripping and transferring mechanisms are mounted on a platform 6 which is in turn mounted on press 5, while receiving mechanism 4 is positioned alongside press 5 and beneath platform 6. This allows tubing 7, continuously extruded from an orifice in the top of press 5, to be severed by cutting mechanism 1, held by gripping mechanism 2, rotated by transfer mechanism 3 to a point above receiving mechanism 4, and released into the receiving mechanism for transfer to a carton 8 or a handling station.

Figure 2:
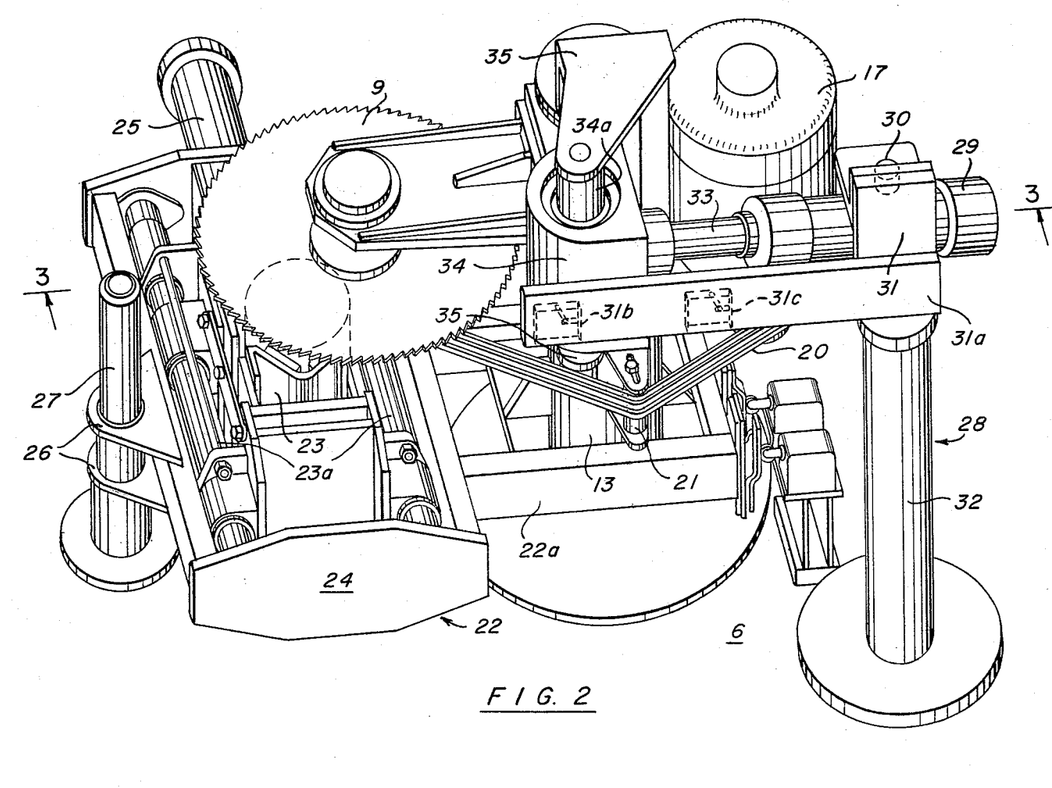
FIGURE 2 is a perspective view of the cutting unit.
Figure 3:
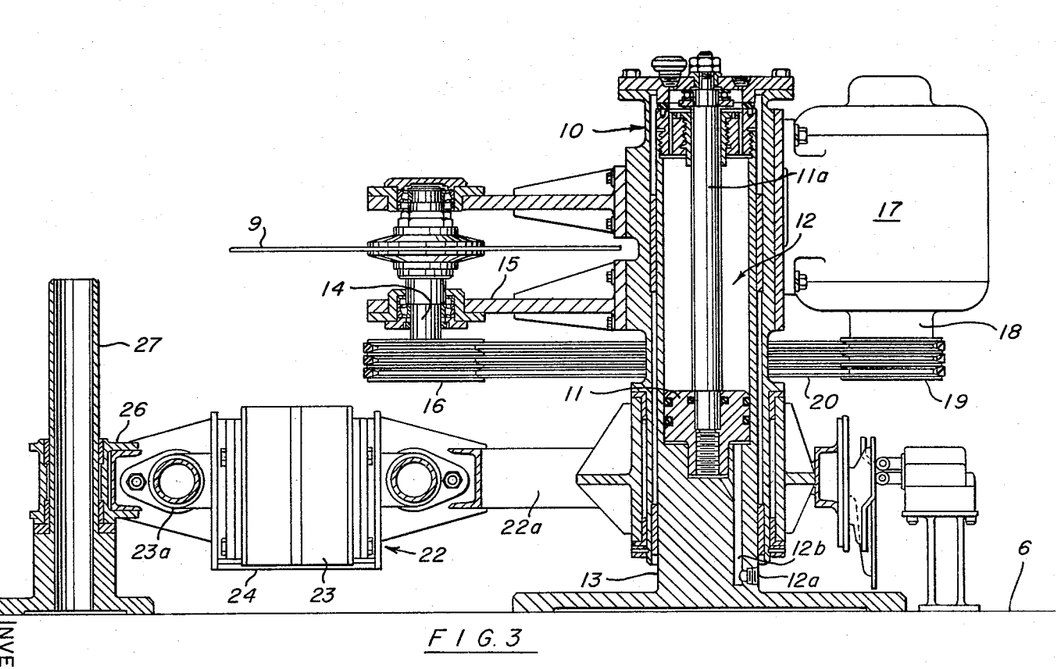
FIGURE 3 is a cross section in elevation taken along the line 3—3 of FIGURE 2.

Cutting mechanism 1 is shown in detail in FIGURES 2 and 3 of the drawings and consists of a circular saw 9 positioned in a horizontal plane and adapted, on the mechanism on which it is mounted, to move laterally against upwardly extruded tubing 7 and also upwardly in conjunction with tubing 7 when the saw bites into the tubing. Saw 9 and its accompanying driving mechanism are mounted on a floating cap 10 which is fixed on the free end of rod 11a of a piston 11 moving vertically within an air cylinder 12 formed within a post 13 which is mounted on platform 6. Post 13 carries a port 12a and a passage 12b linking port 12a and cylinder 12. Saw 9 revolves on an axial shaft 14 which is journalled in a pair of brackets 15 each fixed laterally against cap 10. Shaft 14 extends downwardly through the lower of the brackets 15 and has mounted on its free end a set of pulleys 16. Fixed on cap 10 opposite saw 9 is a drive motor 17 with its drive shaft 18 extending downwardly and carrying pulleys 19 at its free end. Drive bands 20 are mounted on the two sets of pulleys 16 and 19 and to clear cap 10 the drive bands pass over idler pulleys 21 (see FIGURE 2) mounted on cap 10.

To carry saw 9 upwardly at the same rate of speed at which tubing 7 is extruded, a clamping mechanism 22 is mounted on cap 10 through flange 22a. Clamping mechanism 22 consists of a pair of jaws 23 mounted on guide bars 23a which are slidable on a frame 24 and actuated by an air cylinder 25. The outer side of frame 24 opposite flange 22a carries apertured flanges 26 adapted to move along a vertical guide post 27 mounted on platform 6.

Finally, a mechanism denoted generally by numeral 28 is employed to urge saw 9 against tubing 7. Urging mechanism 28 consists of a horizontally disposed air cylinder 29 pivotally mounted on a vertical pin 30 which is journalled in a bracket 31 fixed on a column 32 mounted on platform 6. Piston rod 33 of air cylinder 29 carries at its free end T-shaped bushing 34 having a rod 34a vertically slidable, and also rotatable about its axis, in the head portion of the bushing. The ends of rod 34a projecting above and below bushing 34 are fixed to flanges 35 which are in turn fixed on cap 10. A panel 31a projecting from bracket 31 carries a pair of micro-switches 31b and 31c positioned at the limits of arcuate movement of bushing 34.

Figure 4:
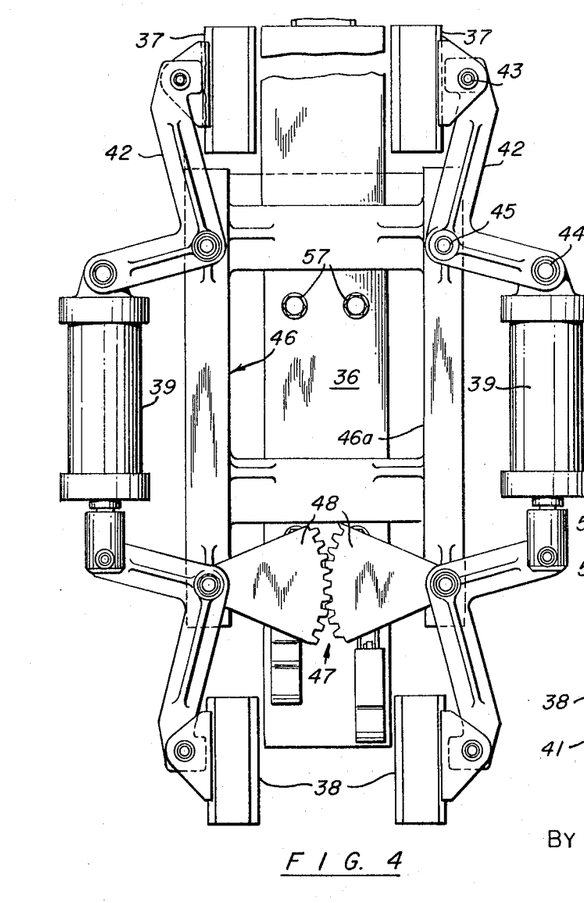
FIGURE 4 is a front view in elevation of the gripping mechanism holding the portion of the extruded pipe to be severed.
Figure 5:
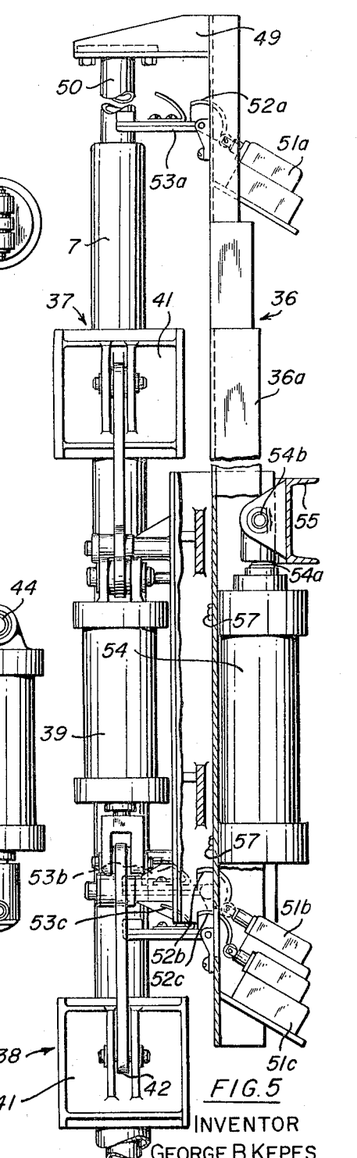
FIGURE 5 is a side view in elevation of the mechanism shown in FIGURE 4.
Figure 6:
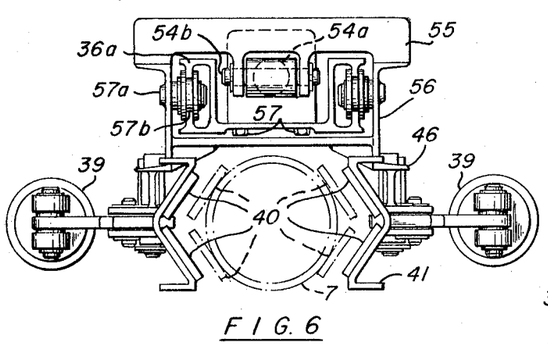
FIGURE 6 is a plan view of the mechanism shown in FIGURE 4.

Gripping mechanism 2 is particularly illustrated in FIGURES 4, 5 and 6 of the drawings. The mechanism is mounted on an upright channel 36 and consists essentially of a pair of upper jaws 37 and a pair of lower jaws 38 symmetrically disposed with respect to the longitudinal axis of the face of channel 36 and moveable together in a horizontal direction by a pair of air cylinders 39. The components of jaws 37 and 38 consist of a pair of angularly disposed gripping plates 40 mounted on a backing plate 41. Each backing plate 41 is linked to one of the air cylinders 39 by a bell crank lever 42, one arm of lever 42 being pivoted to backing plate 41 through a pin 43 and the other arm of the lever being pivoted to air cylinder 39 through a pin 44. The fulcrum of lever 42 is pivoted through a pin 45 to one upright arm 46a of an H-frame 46 slidably mounted on channel 36. It will be seen from FIGURE 4 that air cylinders 39 are free-floating.

Figure 1:
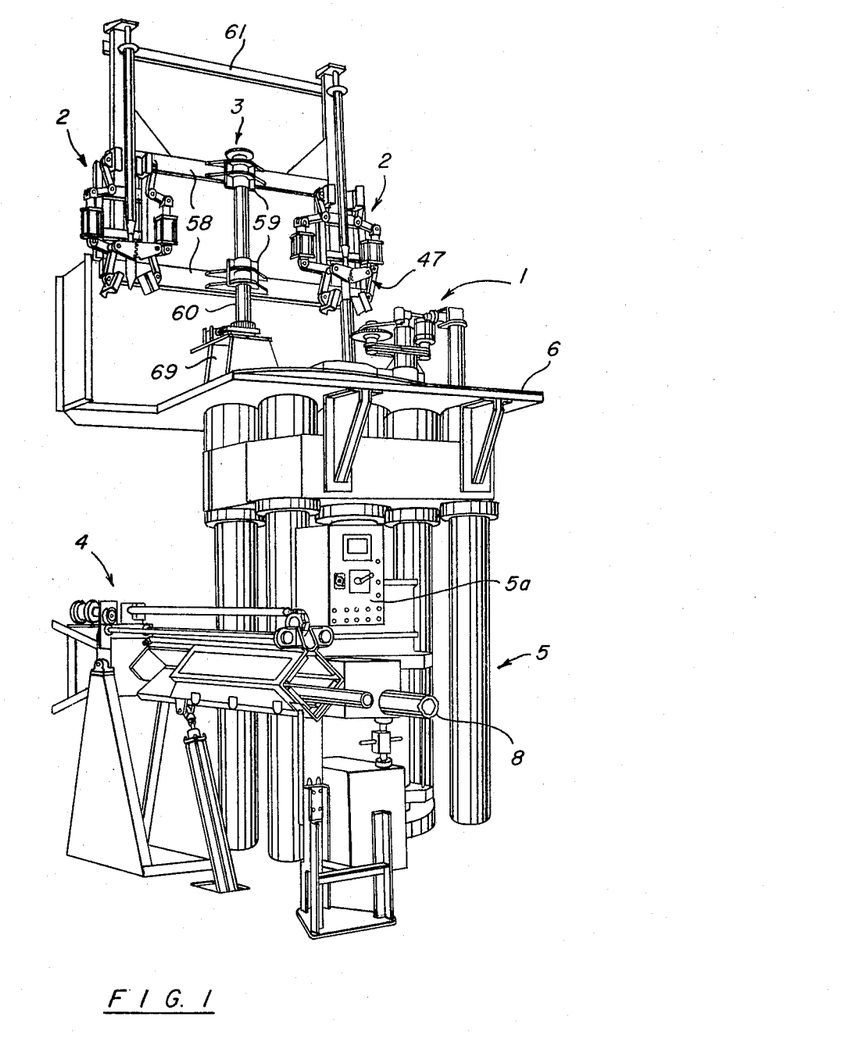
FIGURE 1 is a perspective view of the apparatus associated with an extrusion press.

The horizontal movement of the upper and lower jaws is synchronized by an equalizer mechanism 47 shown in FIGURE 1 of the drawings. Equalizer mechanism 47 comprises a pair of intermeshing gear segments 48, each fixed to one of the lower levers 42 at its fulcrum. Synchronization by equalizer mechanism 47 is especially useful to keep lower jaws 38 balanced when shorter lengths of tubing are being severed and upper jaws 37 are not brought into contact with tubing 7.

At the top of channel 36 a horizontal bracket 49 is mounted. Depending from bracket 49 directly above jaws 37 and 38 is a mandrel 50 having a diameter less than the internal diameter of extruded tubing 7. Also fixed to channel 36 are a series of limit switches 51, positioned one above the other at various distances measured from saw 9 (for example 20″, 22″ and 72″). Three switches 51a, 51b and 51c are shown in FIGURE 5 although it will be appreciated that any number of such switches may be used depending upon the different lengths of sleeving to be produced by the apparatus. Switches 51 are selectively energized from a panel 5a mounted on press 5. Each microswitch 51 has an associated segment 52 on which is mounted a flipper 53. A safety switch (not shown) may also be mounted on frame 36 adjacent bracket 49.

Frame 46, on which jaws 37 and 38 are pivoted, is adapted to slide upwardly and downwardly along channel 36. This is accomplished by an upright air cylinder 54 having the free end of its piston rod 54a pivotally coupled to a cross member 55 through a pin 54b. Cross member 55 is in turn fixed to frame 46 by side flanges 56 positioned laterally of channel 36. Air cylinder 54 is itself fixed to channel 36 by bolts 57. The vertical movement of frame 46 is guided by rollers 57a fixed to side flanges 56 and travelling in slots 57b positioned in the side flanges 36a of channel 36.

Figure 7:
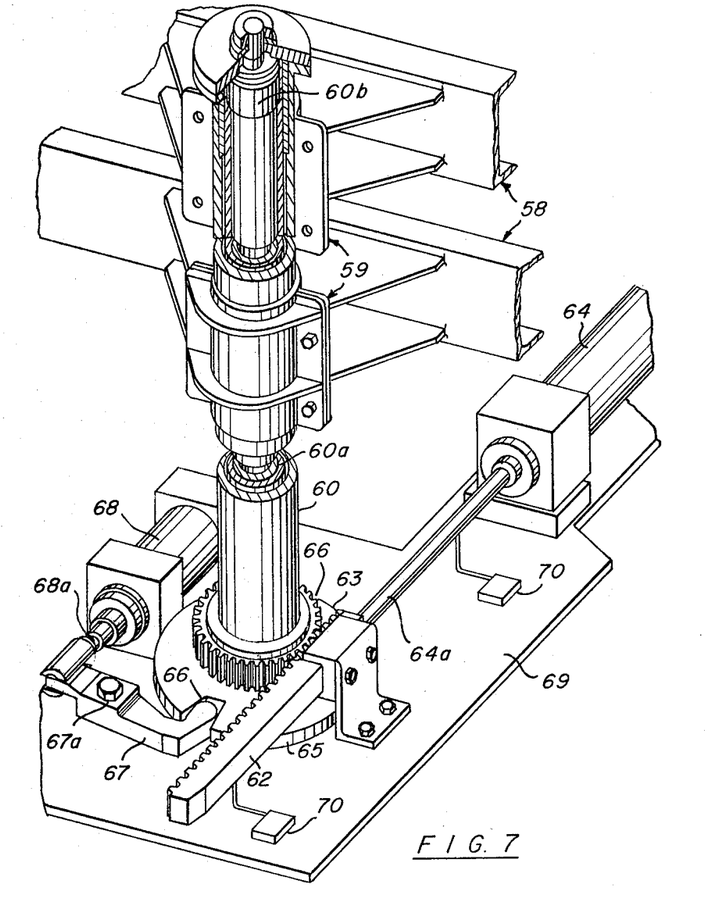
FIGURE 7 is a perspective view, partly broken away, of the mechanism for the horizontal rotation of the gripping mechanism shown in FIGURES 4 to 6.

Transferring mechanism 3 is shown generally in FIGURE 1 and in more detail in FIGURE 7 of the drawings. It will be seen from FIGURE 1 that there are two complete sets of gripping mechanisms 2, one set positioned at each lateral extremity of a pair of cross bars or channels 58 which are fixedly mounted through a pair of double flanges 59 to a vertical hollow shaft 60. A third cross member 61 is employed to secure the upper ends of channels 36. Shaft 60 is concentrically mounted on a vertical post 60a through bearings 60b to rotate through an arc of 180° by means of a ratchet 62 acting on a gear 63 fixed to shaft 60. Ratchet 62 is actuated by an air cylinder 64 through piston rod 64a. Shaft 60 carries adjacent gear 63 a disc 65 having diametrically opposed recesses 66 to receive a dog 67 which is pivoted about a pin 67a and actuated by an air cylinder 68 through a piston rod 68a. Shaft 60 and post 60a, ratchet 62, cylinder 64, dog 67, and cylinder 68 are all mounted on a dais 69 which is itself mounted on platform 6. Two microswitches 70 are positioned on dias 69, one at each extremity of the movement of ratchet 62 between two end points.

Figures 8, 9:
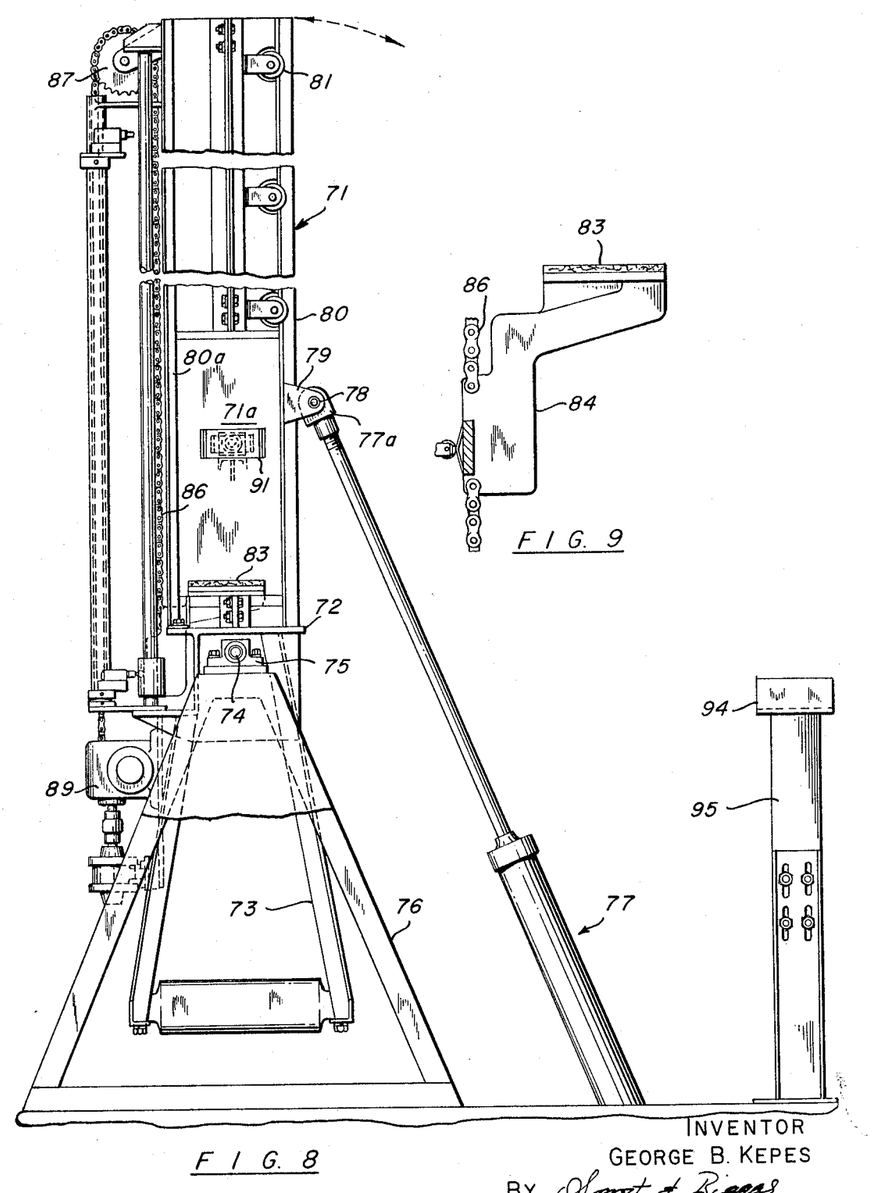
FIGURE 8 is a side view in elevation of the means for receiving severed tubes from the gripping mechanism and transferring them to cartons.
FIGURE 9 is a side view of the platform element operating within the mechanism shown in FIGURE 8.

Receiving mechanism 4, shown generally in FIGURE 1, is illustrated in detail in FIGURES 8 to 11. The transferring mechanism comprises a tube 71, rectangular in cross section, which is closed at one end by a plate 72. A pair of frame members 73 fixed to the outward face of plate 72 carry a fixed pivot rod 74 which is journalled in a pair of bearings 75 mounted on a supporting truss 76. By this construction tube 71 is able to be rotated from a vertical position as shown in FIGURE 8 to a horizontal position as shown in FIGURE 1. An air cylinder 77 is pivoted at one end 77a through a pin 78 and brackets 79 to tube 71 and at the other end to an anchor pin (not shown). Brackets 79 are fixed to tube 71 at a point spaced from plate 72 and at one of trough edges 80 of the tube. A series of rollers 81 is positioned on tube 71 along trough edge 80 in a manner such that the bearing surface 82 of each roller is located along the inside of the trough. A platform 83 having its bearing surface normal to the longitudinal axis of tube 71 (and parallel to plate 72) is slidably disposed within tube 71. Platform 83 carries an arm 84 which projects outside tube 71 and travels in a longitudinal slot 85 located in the trough 80a of the tube diametrically opposite trough 80. Arm 84 is coupled to an endless chain 86 which passes over an idler sprocket 87 mounted on tube 71 and over a drive sprocket 88 which is a component of a drive mechanism 89 mounted on frame members 73.

Figures 10, 11:
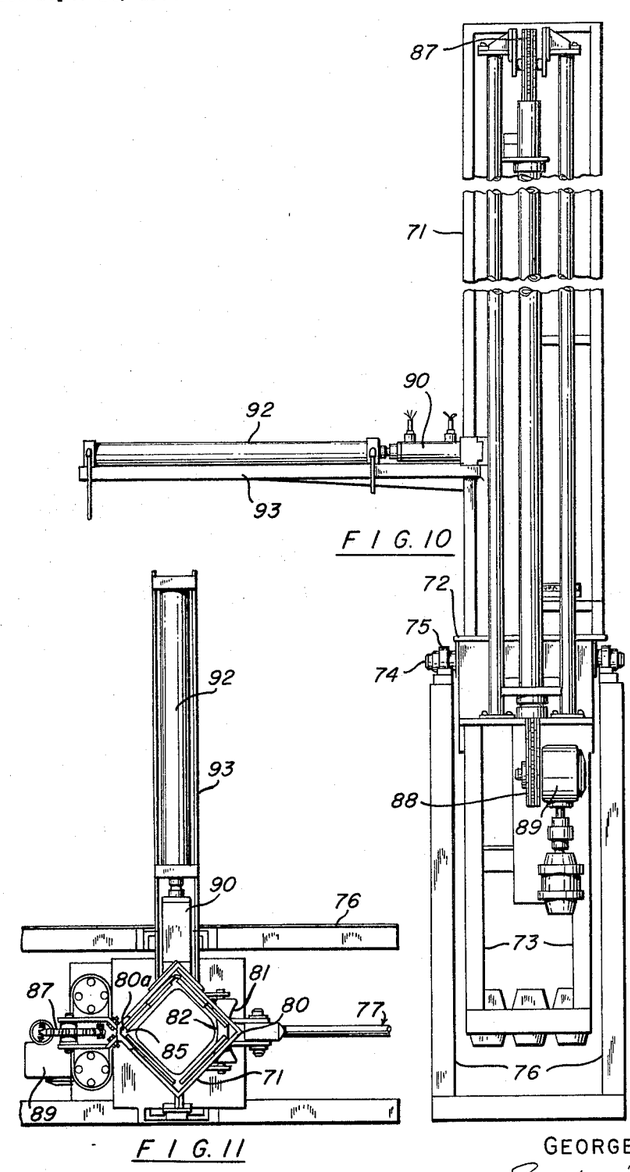
FIGURE 10 is a rear view in elevation of the mechanism shown in FIGURE 8.
FIGURE 11 is a top view of the mechanism shown in FIGURE 8.

Adjacent end plate 72 a portion of two walls of tube 71 are cut away to provide an opening 71a through which short severed tubes may be removed without the necessity of lowering tube 71 to a horizontal position. Removal of severed tubes through opening 71 is aided by a pushrod 90 movable laterally into tube 71 through a port 91 in the side walls of the tube. Push rod 90 is actuated by an air cylinder 92 mounted on a support 93 fixed to the side of tube 71. As mentioned, this mechanism is used when short lengths of tubing are being cut. (Say up to 30″.) For longer lengths, the severed tube is pushed out of tube 71 by platform 83.

A V-shaped tube rest 94 mounted on a column 95 and spaced an appropriate distance from supporting truss 76 enables the free end of tube 71 to be supported in its lowered position. Tube rest 94 can be extended to support a carton for the severed tubing coming from tube 71.

In the operation of the device a continuous length of tubing is extruded from the top of press 5 through an orifice in platform 6 and between jaws 23 of clamping mechanism 22. Tubing 7 continues its travel upwardly to pass between jaws 38 and 37 respectively until the free end of the tube meets flipper 53 and actuates the particular microswitch 51 which is energized from panel 5a depending upon the desired length of sleeve to be severed from tubing 7. Microswitch 51 actuates air cylinders 25 to close jaws 23, actuates air cylinders 39 to close jaws 37 and 38, and actuates air cylinder 29 to move saw 9 against tubing 7. Clamping mechanism 22 being fixed to cap 10, the cap rises with the continued upward movement of tubing 7 and thus enables saw 9 to travel with the tubing without relative longitudinal displacement. Air pressure supplied to cylinder 12 through port 12a and passage 12b is gauged to offset the weight of cap 10 and its accoutrements so that the weight is not transferred to tubing 7 through saw 9. At the same time air cylinder 54 operates to lift frame 46 with jaws 37 and 38. The movement of air cylinder 52 is adjusted to overspeed the movement of tubing 7 so that the portion of the tubing held by jaws 37 and 38 is under tension with respect to the portion of the tubing below saw 9, to prevent the saw from binding.

When saw 9 has severed tubing 7 microswitch 31b will activate air cylinder 29 to retract the saw blade to its original position of rest. On the return of saw blade 9 to its position of rest, bushing 34 actuates microswitch 31c which then (a) deactivates cylinder 29, (b) releases jaws 23 of clamping mechanism 22, (c) releases the air from cylinder 12 to allow saw 9 to return to its original position, (d) actuates cylinder 68 to release dog 67 from recess 66, and (e) actuates cylinder 64 to turn shaft 60 by means of ratchet 62. On the rotation of shaft 60 through 180°, dog 67 will engage the second recess 66 and lock gripping mechanism 2 in an exact position whereby the severed sleeving is poised directly above receiving mechanism 4. With this movement the second unit of gripping mechanism 2 will be positioned directly above tubing 7 being extruded from press 5 so that the above sequence can be repeated while the first unit of gripping mechanism 2 is releasing its severed sleeving.

The actuation of outer limit switch 70 by ratchet 62 deactivates air cylinder 64.

Limit switch 70 also actuates air cylinders 39 to open upper and lower jaws 37 and 38, releasing the severed sleeve. On its release the severed sleeve drops into tube 71 (positioned vertically) and onto platform 83 which has been positioned adjacent the top of tube 71. Drive mechanism 89 is then actuated to lower platform 83 and the severed sleeve into tube 71. When platform 83 comes to rest at the bottom of tube 71, air cylinder 77 is actuated to lower tube 71 into a horizontal position so that the end of tube 71 comes to rest on tube rest 94. When tube 71 comes to rest in a horizontal position, drive mechanism 89 is again actuated to advance platform 83 forwardly in tube 71 to eject the severed sleeve into a carton or other receiving device. Rollers 81 permit a smooth ejection of the severed sleeve. Suitable timers (not shown) permit the above sequence of operations to be carried out in correlation with the movement of transferring mechanism 3. For instance there is a time lapse of two seconds between the opening of jaws 37 and 38 and the beginning of the downward movement of platform 83 in tube 71. Of course tube 71 must be returned to its vertical position before the completion of rotation of shaft 60 positioning another severed sleeve above receiving mechanism 4.

If the length of severed sleeving will permit it to be removed from tube 71 through opening 71a then air cylinder 92 will be actuated instead of air cylinder 77, pushing the severed sleeve outwardly through opening 71a instead of lowering tube 71.

It will be appreciated that variations and refinements of the device may be incorporated. The flipper switches illustrated in FIGURE 5 could be replaced with a photoelectrically actuated switch. Oil (or other liquid) operated cylinders may replace the various air cylinders. A suction hood could be mounted on paltform 6 adjacent saw blade 9 to collect cuttings.

What I claim is:

1. Apparatus for cutting and handling rigid tube or bar material fed continuously from a source comprising: means to grip the material as it is fed from the source; means to sever a given length of material as it is fed from the source; the gripping means and the severing means being adapted to travel with the material as it moves away from the source whereby their given functions may be performed; and transfer means for moving the gripping means transversely of the line of travel of the continuously fed material to transfer the severed material laterally away from said line of travel and thereafter release the severed material from the gripping means.

2. Apparatus as claimed in claim 1 wherein the gripping means comprises at least one pair of clamps mounted on the transfer means and adapted to close transversely of the line of travel of the continuously fed material.

3. Apparatus as claimed in claim 2 including means to urge the clamps along the line of travel of the continuously fed material at a speed greater than the speed of travel of the material being fed from the source.

4. Apparatus as claimed in claim 2 including means to equalize the opening and closing movement of the clamps.

5. Apparatus as claimed in claim 2 including means to synchronize the closure of the pair of clamps about the material.

6. Apparatus as claimed in claim 1 wherein the transfer means comprises an arm having at least one pair of clamps mounted at each end thereof, the arm being adapted to rotate in an arc of 180° about an axis transverse to its longitudinal axis at the mid-point thereof.

7. Apparatus as claimed in claim 6 including means to actuate the clamps to release the severed material at the terminal point of rotation of the arm opposite the line of travel of the continuously fed material.

8. Apparatus as claimed in claim 1 including means to receive the severed material on its release from the gripping means.

9. Apparatus as claimed in claim 1 wherein the severing means comprises a circular saw movable transversely into the line of travel of the continuously fed material.

10. Apparatus as defined in claim 9 wherein the circular saw is mounted on a free floating cylinder, second gripping means being also mounted on the free floating cylinder and adapted to grip the material as it is fed from the source, and means actuated by the material to actuate the second gripping means when the end of the material reaches a predetermined height above the plane of the saw.

11. Apparatus as claimed in claim 10 including means to retract the saw from the line of travel of the material when the material has been severed, and means to release the second gripping means.

12. Apparatus as defined in claim 1 wherein the gripping means comprises two pairs of clamps mounted on the transfer means and positioned to close transversely of the line of travel of the continuously fed material, each jaw of each pair of clamps being mounted on one arm of a bell crank pivoted at its fulcrum on the transfer means, the other arm of each bell crank on one side of said line of travel being pivoted on its free end to a first floating cylinder, the other end of each bell crank on the other side of said line of travel being pivoted on its free end to a second free floating cylinder, whereby the upper and lower clamps move in unison on actuation of said first and second cylinders.

13. Apparatus for cutting and handling rigid tube or bar material fed continuously from a source comprising: an arm having at least one pair of clamps mounted on each end thereof, said clamps being positioned to close transversely of the line of travel of the continuously fed material; a circular saw movable transversely into the line of travel of the continuously fed material to sever a given length of the material as it is fed from the source; means to rotate the arm in an arc of 180° about an axis transverse to its longitudinal axis at the mid-point thereof; the clamps and the saw being adapted to travel with the material as it moves away from the source whereby their given functions may be performed.

14. Apparatus as claimed in claim 13 including means to actuate the clamps to release the severed material at the terminal point of rotation of the arm opposite the line of travel of the continuously fed material, and means to receive the severed material on its release from the clamps.

15. Apparatus for cutting and handling rigid tube or bar material fed continuously upward from a source comprising: at least one pair of clamps operable horizontally and positioned to close transversely of the line of travel of the material whereby the material is gripped as it is fed upwardly from the source; a horizontally disposed circular saw movable transversely into the line of travel of the upwardly fed material; a horizontally disposed transverse arm carrying a pair of said clamps at each end thereof and adapted to rotate about a vertical axis whereby each pair of clamps is positioned alternately in the line of travel of the upwardly fed material; the clamps and the saw being adapted to travel upwardly with the tube material as it moves away from the source whereby their given functions may be performed.

16. Apparatus as claimed in claim 15 including means to actuate the clamps to release severed material gripped by the clamps at a terminal point of rotation of the arm away from the line of travel of the upwardly fed material; and means to receive the severed material on its release from the clamps.

17. Apparatus as claimed in claim 16 wherein the means to receive the severed tube comprises a vertical receiving material having a platform transverse to the longitudinal axis of the receiving tube and movable along the receiving tube, the receiving tube being rotatable into a horizontal position, the platform being adapted to move along the receiving tube to lower the severed material received from the clamps when the receiving tube is in a vertical position and eject the severed tube from the receiving material when the latter is rotated into a horizontal position.

18. Apparatus as claimed in claim 17 wherein the receiving tube has an elongated aperture in its wall adjacent the lower end thereof, and including means mounted on the receiving tube diametrically opposed to the aperture and adapted to eject severed material transversely through the aperture when the receiving tube is vertical.

19. Apparatus as claimed in claim 15 including means to urge the pair of clamps in the direction of travel of the material.

20. Apparatus as claimed in claim 15 wherein the transverse arm is mounted on a vertical shaft, and including means to releasably lock the shaft in predetermined position.

21. Apparatus for cutting and handling rigid tube or bar material fed continuously upward from a source comprising at least one pair of clamps having jaws horizontally movable to grip the continuously fed material adjacent its free end, a horizontally disposed circular saw movable transversely against the material and below the clamps, a horizontal transverse arm carrying the clamps and rotatable about a vertical axis to move the clamps transversely out of the line of travel of the material, and the saw being adapted to travel with the material as it moves away from the source whereby the material may be severed over a time interval.

22. Apparatus as claimed in claim 21 including further clamps associated with the saw and adapted to grip the material being fed from the source whereby the saw may travel upwardly with the material.

23. Apparatus as claimed in claim 22 wherein the transverse arm rotates about a vertical shaft fixed at its midpoint, a pair of said clamps being carried at each end of the transverse arm, and means comprising a vertical tube disposed below the pair of clamps removed from the line of travel of the material for receiving severed material from said pair of clamps.

24. Apparatus as defined in claim 23 including first actuating means to move the pair of clamps to grip the material when the end of the material reaches a predetermined height above the plane of the saw, moving the further clamps to grip the material below the saw, and to move the saw against the material; second actuating means to retract the saw when it has severed the material; third actuating means to terminate the retraction of the saw, to release the further clamps, and to rotate the transverse arm about an arc of 180°; and fourth actuating means to release the clamps holding the severed material whereby the severed material drops into the vertical tube.

References Cited by the Examiner

UNITED STATES PATENTS

| | | | |
|---|---|---|---|
| 1,439,963 | 12/1922 | Kamper | 83—319 X |
| 2,163,967 | 6/1939 | Strawn et al. | 83—319 X |
| 2,287,833 | 6/1942 | Ridgway | 83—292 |
| 2,692,693 | 10/1954 | Newbarg | 214—1 X |
| 2,984,138 | 5/1961 | Vitense et al. | 83—337 |
| 3,164,048 | 1/1965 | Wray et al. | 83—310 X |
| 3,174,373 | 3/1965 | Gensman | 83—110 |

FOREIGN PATENTS 555,495   1/1957   Italy.

ANDREW R. JUHASZ, *Primary Examiner.*